US012566868B2

(12) United States Patent
Rao et al.

(10) Patent No.: US 12,566,868 B2
(45) Date of Patent: Mar. 3, 2026

(54) APPARATUS AND METHODS FOR BINDING A SYSTEM ON CHIP AND A MEMORY DEVICE WITH A KEY

(71) Applicant: QUALCOMM Incorporated, San Diego, CA (US)

(72) Inventors: Yashavantha Rao, Hyderabad (IN); Debasish Mandal, Hooghly (IN); Manohar Kallutla, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 204 days.

(21) Appl. No.: 18/362,122

(22) Filed: Jul. 31, 2023

(65) Prior Publication Data

US 2025/0045420 A1     Feb. 6, 2025

(51) Int. Cl.
| | |
|---|---|
| *G06F 21/60* | (2013.01) |
| *G06F 21/72* | (2013.01) |
| *G06F 21/79* | (2013.01) |

(52) U.S. Cl.
CPC ............ *G06F 21/602* (2013.01); *G06F 21/72* (2013.01); *G06F 21/79* (2013.01)

(58) Field of Classification Search
CPC ........ G06F 21/602; G06F 21/72; G06F 21/79; G06F 21/44
See application file for complete search history.

(56) References Cited

U.S. PATENT DOCUMENTS

| | | | | |
|---|---|---|---|---|
| 2014/0331064 | A1* | 11/2014 | Ballesteros | ......... G06F 12/1408 |
| | | | | 713/193 |
| 2015/0236856 | A1* | 8/2015 | Moore | .................. H04L 9/3247 |
| | | | | 713/176 |
| 2017/0060595 | A1* | 3/2017 | Keidar | ...................... H04L 9/30 |
| 2017/0177373 | A1 | 6/2017 | Jeansonne et al. | |
| 2020/0014544 | A1 | 1/2020 | Sela et al. | |
| 2022/0382872 | A1* | 12/2022 | Sakib | ................... H04L 9/3247 |

FOREIGN PATENT DOCUMENTS

| | | |
|---|---|---|
| EP | 2973156 B1 | 4/2018 |

OTHER PUBLICATIONS

Corresponding PCT Search Report and Written Opinion for PCT Application No. PCT/US2024/032881 issued by the European Patent Office (EPO) acting as ISA for WIPO, PCT case filed on Jun. 6, 2024, Report & Written Opinion mailed on Aug. 26, 2024, 10 Pages.

* cited by examiner

*Primary Examiner* — Matthew T Henning
(74) *Attorney, Agent, or Firm* — Smith, Tempel, Blaha, LLC

(57) ABSTRACT

Methods and apparatuses directed to providing multi-key support within die architectures, such as System-on-a-Chips. In some examples, a die package includes key activation fuses, key revocation fuses, and key fuses for multiple keys. The die package also includes a processor electrically coupled to the key activation fuses, the key revocation fuses, and the plurality of key fuses. Further, the processor can generate a first key value and write the first key value to the key fuses to generate a first key. The processor can also write to the key activation fuses to activate the first key. The processor can further provision the first key to a first memory device. When the first memory device is replaced with a second memory device, the processor can write to the key revocation fuses to revoke the first key, and can provision a second key to the second memory device.

17 Claims, 8 Drawing Sheets

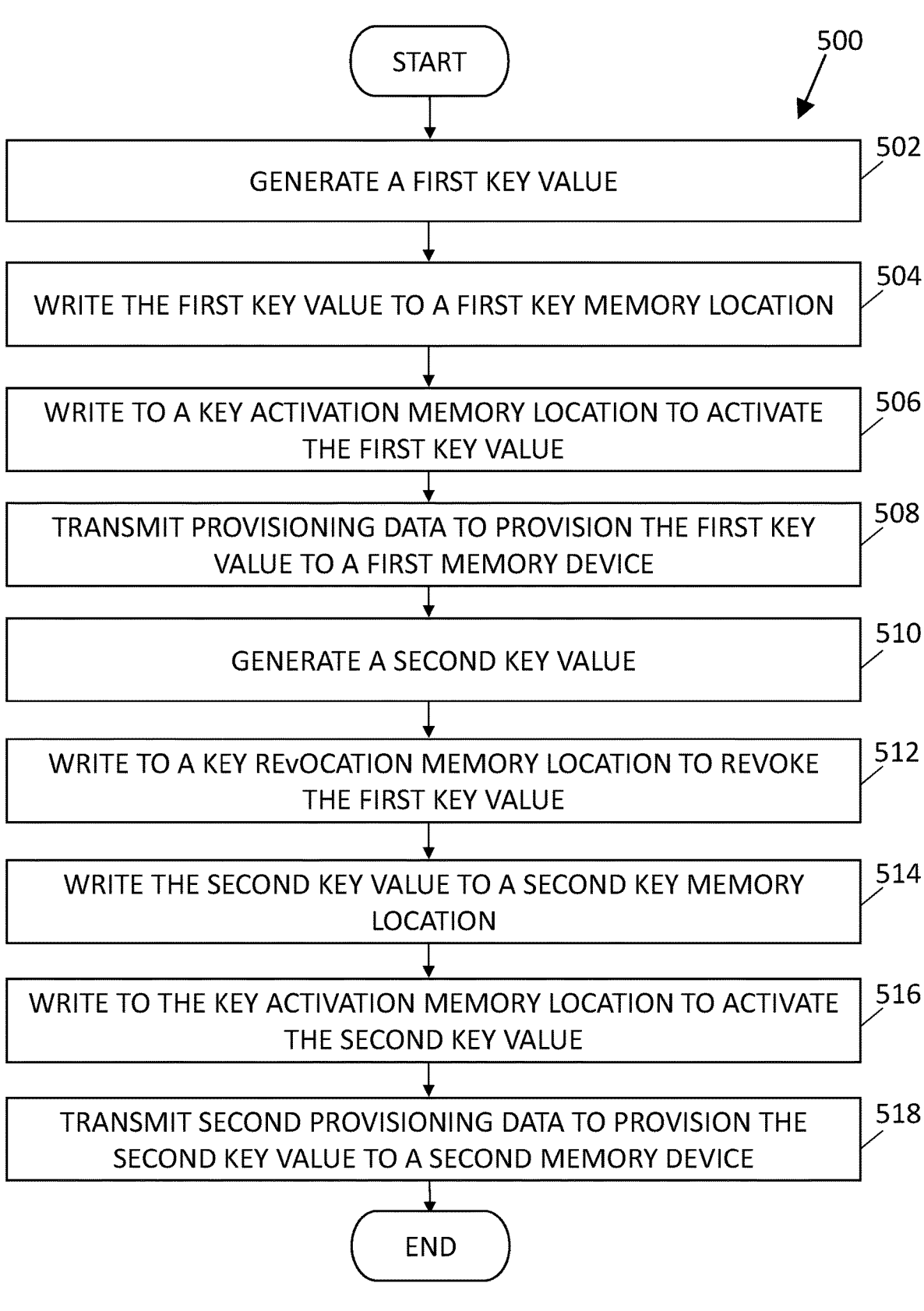

500

START

GENERATE A FIRST KEY VALUE — 502

WRITE THE FIRST KEY VALUE TO A FIRST KEY MEMORY LOCATION — 504

WRITE TO A KEY ACTIVATION MEMORY LOCATION TO ACTIVATE THE FIRST KEY VALUE — 506

TRANSMIT PROVISIONING DATA TO PROVISION THE FIRST KEY VALUE TO A FIRST MEMORY DEVICE — 508

GENERATE A SECOND KEY VALUE — 510

WRITE TO A KEY REvOCATION MEMORY LOCATION TO REVOKE THE FIRST KEY VALUE — 512

WRITE THE SECOND KEY VALUE TO A SECOND KEY MEMORY LOCATION — 514

WRITE TO THE KEY ACTIVATION MEMORY LOCATION TO ACTIVATE THE SECOND KEY VALUE — 516

TRANSMIT SECOND PROVISIONING DATA TO PROVISION THE SECOND KEY VALUE TO A SECOND MEMORY DEVICE — 518

END

FIG. 5

APPARATUS AND METHODS FOR BINDING A SYSTEM ON CHIP AND A MEMORY DEVICE WITH A KEY

BACKGROUND

Field of the Disclosure

This disclosure relates generally to die architectures and, more particularly, to binding System-on-a-Chip (SoC) architectures with memory devices using keys.

Description of Related Art

In various applications, die architectures, such as system-on-a-chip (SoC) architectures, use keys to bind to other devices, such as memory devices. The use of keys to bind SoCs with other devices provides device security benefits. For example, when bound by a key to a memory device, an SoC can access secure data maintained within the memory device. Other devices, such as other SoCs, however, cannot gain access to the secured data within the memory device without the key. Typically, the key is programmed into the memory device once. For instance, the memory device may be a one-time-programmable (OTP) memory, such a read-only memory (ROM) or fuse. The SoC device may provision the key to the memory device, with both the SoC and the memory device storing the key. Once the key is provisioned to the memory device, the SoC and memory device are bound.

SUMMARY

According to an aspect, a die package includes a first memory device, and a processor electrically coupled to the first memory device. The processor is configured to write to a key revocation location of the first memory device, the writing to the key revocation location revoking a first key stored in a first key location of the first memory device. The processor is also configured to write a second key to a second key location of the first memory device. Further, the processor is configured to write to a key activation location of the first memory device, the writing to the key activation location activating the second key. The processor is also configured to generate provisioning data characterizing the second key. Further, the processor is configured to transmit the provisioning data to a second memory device, the provisioning data causing the second memory device to store the second key.

According to another aspect, a method by a processor includes writing to a key revocation location of the first memory device, the writing to the key revocation location revoking a first key stored in a first key location of the first memory device. The method also includes writing a second key to a second key location of the first memory device. Further, the method includes writing to a key activation location of the first memory device, the writing to the key activation location activating the second key. The method also includes generating provisioning data characterizing the second key. Further, the method includes transmitting the provisioning data to a second memory device, the provisioning data causing the second memory device to store the second key.

According to another aspect, a non-transitory, machine-readable storage medium comprises instructions that, when executed by at least one processor, cause the at least one processor to perform operations. The operations include writing to a key revocation location of the first memory device, the writing to the key revocation location revoking a first key stored in a first key location of the first memory device. The operations also include writing a second key to a second key location of the first memory device. Further, the operations include writing to a key activation location of the first memory device, the writing to the key activation location activating the second key. The operations also include generating provisioning data characterizing the second key. Further, the operations include transmitting the provisioning data to a second memory device, the provisioning data causing the second memory device to store the second key.

According to another aspect, a die package includes a plurality of key activation fuses, each of the plurality of key activation fuses being configured to activate a corresponding one of a plurality of keys. The die package also includes a plurality of key revocation fuses, each of the plurality of key revocation fuses being configured to revoke a corresponding one of the plurality of keys. Further, the die package includes a key fuse associated with each of the plurality of keys, each key fuse being configured to store a corresponding one of the plurality of keys. The die package also includes a processor electrically coupled to the plurality of key activation fuses, the plurality of key revocation fuses, and the key fuse associated with each of the plurality of keys. The processor is configured to generate a first key value. The processor is also configured to write the first key value to the key fuse associated with a first one of the plurality of keys. Further, the processor is configured to write to a first one of the plurality of key activation fuses to activate the first one of the plurality of keys. The processor is also configured to write to a first one of the plurality of key revocation fuses to revoke the first one of the plurality of keys. The processor is further configured to write to a second one of the plurality of key activation fuses to activate a second one of the plurality of key.

BRIEF DESCRIPTION OF DRAWINGS

FIG. 5 is a flowchart of an exemplary process for binding a system-on-a-chip with memory devices, according to some implementations.

DETAILED DESCRIPTION

Figure 1:
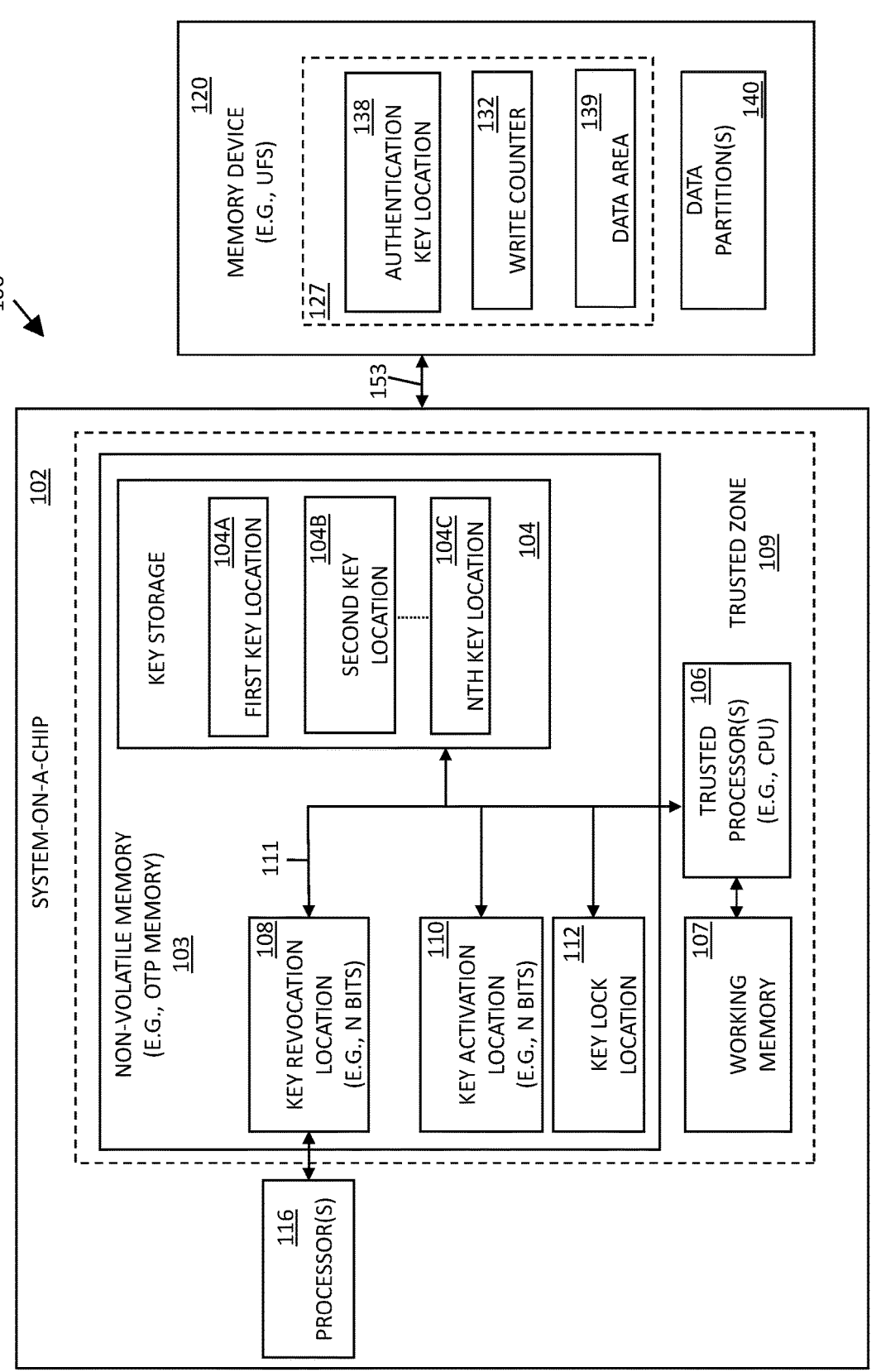
FIG. 1 is a block diagram of a die package, according to some implementations.

While the features, methods, devices, and systems described herein may be embodied in various forms, some exemplary and non-limiting embodiments are shown in the drawings, and are described below. Some of the components described in this disclosure are optional, and some implementations may include additional, different, or fewer components from those expressly described in this disclosure.

The embodiments described herein are directed to providing multi-key support within die architectures, such as System-on-a-Chips (SoCs). For instance, an SoC may include multiple key locations, where only one of the multiple key locations is active at any one time. The multiple key locations may be located within a secure FLASH memory of the SoC, for example. The SoC may program a first key, such as a first private key (e.g., a first cryptographic key), into a first key location, and may activate the first key location. Further, the SoC may provision (e.g., securely program) the first key to a first memory device, such as a Universal Flash Storage (UFS) device, thereby binding the SoC to the first memory device based on the first key. For instance, the SoC may perform operations to securely store the first key within an key location of the first memory device. The first key may be stored within a Replay Protected Memory Block (RPMB) of the first memory device, for example. The SoC may now securely access (e.g., read data from, write data to) the first memory device based on the first key. For example, when bound, the SoC can successfully access memory locations of the first memory device (or, in some examples, at least a portion of the memory locations of the first memory device, such as memory locations requiring authenticated access) using read and write accesses that are authenticated with the first key. In contrast, the first memory device will not service (e.g., allow) a read or write access to its memory locations (or, in some examples, to a portion of its memory locations) that is not authenticated with the first key.

In some instances, however, the first memory device may fail. For example, as a number of data reads and/or writes to a memory device increases, its memory cells may deteriorate thereby causing storage failures. As such, over time, the first memory device may begin to fail (e.g., after three years). The lifespan of the SoC, however, may be much longer than that of the first memory device. For instance, in automotive applications, an SoC may have a lifespan of fifteen or more years. If the first memory device fails, the SoC is unable to reliably access the first memory device. The embodiments, however, allow for the replacement of the first memory device with a second memory device without having to replace the SoC.

For instance, the failing first memory device may be replaced with a second memory device. Further, the SoC may deactivate the first key location, and may program a second key into a second key location. The SoC may then activate the second key location. The SoC may also provision the same second key to the second memory device (which may be another UFS device), thereby binding the SoC to the second memory device based on the second key. The SoC may now securely access the second memory device based on the second key.

Among other advantages, the embodiments allow a die architecture, such as an SoC, to provide multi-key support where only one of a plurality of keys are active at one time. The SoC can provision an active key to a memory device, and the SoC and the memory device can exchange data securely based on the active key. Should the memory device fail, the memory device can be replaced with another memory device, and the SoC can provision a new key to the other memory device. Thus, the embodiments may allow for the replacement of the memory device without replacing the SoC, thereby providing cost savings and extending the life of an SoC. For instance, if a memory device typically lasts six years, and the SoC supports three keys, the embodiments may allow the SoC to perform operations for eighteen years, six years with each of three memory devices. Thus, rather than requiring three SoCs and three memory devices for a total of eighteen years of operation, the embodiments may allow for the same total of eighteen years of operation, but with only one SoC and three memory devices. Persons of ordinary skill in the art would recognize these and other benefits as well.

FIG. 1 is a block diagram of an integrated circuit package 100 that includes a System-on-a-Chip (SoC) 102 electrically coupled to a memory device 120 over a communication bus 153. Communication bus 153 may provide a serial interface, or a parallel interface, for example. Further, as illustrated, SoC 102 may include non-volatile memory 103 (e.g., a read-only memory (ROM)) electrically coupled to one or more processors 106, 116. Each processor 106, 116 may be, for instance, a processing core, a graphical processing unit (GPU), central processing unit (CPU), a microcontroller, or any other suitable processing device. Non-volatile memory 103 may be, for example, a one-time-programmable (OTP) memory device that includes one or more fuses (e.g., e-fuses). As illustrated, non-volatile memory 103 may include various storage locations including a key revocation location 108, a key activation location 110, a key lock location 112, and key storage 104 locations including a first key location 104A, second key location 104B, and an N$^{th}$ key location 104C. In some examples, each of the key revocation location 108, key activation location 110, key lock location 112, and key storage 104 locations may include one or more fuses, as described herein. For instance, key revocation location 108 may include a number of bits (e.g., "N" bits), each bit representing a revocation fuse. Likewise, key activation location 110 may include a number of bits, each bit representing an activation fuse. Trusted processor 106 may write to one or more of the fuses of each of the key revocation location 108, key activation location 110, key lock location 112, and key storage 104 locations. For instance, trusted processor 106 may write an address of a corresponding fuse to a fuse address register, and may write the data to be written to the fuse to a fuse data register. The trusted processor may then write to a fuse write register, which causes the data in the fuse data register to be written to the fuse located at the address in the fuse address register. The fuse address register, the fuse data register, and the fuse write register may be located within the non-volatile memory 103, for example. In other instances, trusted processor 106 may write the data directly to an address corresponding to a fuse. SoC 102 may also include a working memory 107 electrically coupled to the one or more trusted processors 106. Working memory 107 may be a random access memory (RAM), for instance.

In some instances, non-volatile memory 103, working memory 107, and the one or more trusted processors 106 may communicate over an internal bus 111, and form all or part of a trusted zone 109 that provides for secure processing. The trusted zone 109 provides a private and secure processing environment within SoC 102. For instance, while trusted processor 106 may write to key revocation location 108, key activation location 110, and to the storage locations within key storage 104, processor 116 (i.e., untrusted processor 116) cannot, as processor 116 is not within the trusted zone 109. In some examples, trusted processor 106 may establish virtual processors, where each virtual processor is associated with corresponding hardware assets. For instance, a first virtual processor of trusted processor 106 may be configured to communicate outside of the trusted zone 109 over communication bus 153, while a second virtual processor of trusted processor 106 may be configured to communicate within the trusted zone 109 over the internal bus 111.

As noted above, processor 116 is not within the trusted zone 109, and thus can access a location within key storage 104, such as first key location 104A, second key location 104B, and Nth key location 104C, based on access controls defined within the key revocation location 108 and the key activation location 110. For instance, key activation location 110 may include one or more fuses, where each fuse determines whether access to a corresponding location within key storage 104 is active (e.g., enabled). In addition, key revocation location 108 may include one or more fuses, where each fuse determines whether access to a corresponding location within key storage 104 has been revoked (e.g., disabled). For processor 116 to access a particular location within key storage 104, a corresponding fuse within key activation location 110 must have the location active and a corresponding fuse within key revocation location 108 must not have the location revoked. If the corresponding location is not active (e.g., as determined by key activation location 110), or the corresponding location has been revoked (e.g., as determined by key revocation location 108), processor 116 cannot access the corresponding location within key storage 104 (e.g., due to one or more corresponding "blown" fuses). Further, key lock location 112 may include one or more configuration settings that disable read access to key storage 104. For instance, trusted processor 106 may write to the key lock location 112 to disable processor 116 from reading one or more locations within key storage 104, such as from reading the first key location 104A.

Memory device 120 may be, for example, a FLASH memory, such as a Universal Flash Storage (UFS) device. The memory device 120 may include a Replay Protected Memory Block (RPMB) 127, as well as one or more additional data partitions 140. The RPMB 127 can only be access using authenticated reads and writes. In this example, RPMB 127 includes an authentication key location 138, a write counter 132, and a data area 139. Authentication key location 138 may store an authentication key, such as an authentication key provisioned by SoC 102 as described herein. The value of the write counter 132 indicates the number of writes to RPMB 127 (e.g., the number of 256 byte blocks written). Further, data area 139 allows for the storage of secure data, such as for the storage of a trusted application.

In some examples, memory device 120 stores executable instructions within one or more data partitions 140. Trusted processor 106 may receive the instructions from the memory device 120, and may store the instructions in working memory 107. For example, trusted processor 106 may perform one or more read operations over communication bus 153 with memory device 120 to receive the instructions form the data partitions 140 of memory device 120. The trusted processor 106 may also perform one or more write operations with working memory 107 to store the instructions within working memory 107. Further, trusted processor 106 may execute the instructions stored within working memory 107 to carry out one or more of the operations described herein.

SoC 102 provides multi-key support where only one key is active and available for provisioning at any given time (e.g., as controlled by key activation location 110) and, before activating another key, the current active key is revoked (e.g., as controlled by key revocation location 118). For instance, based on executing instructions (e.g., the instructions stored within working memory 107), trusted processor 106 can generate a key value for a key, such as an authentication key, a private key, a cryptographic key, or an RSA key. The key may be, for example, a 521 bit key, a 1024 bit key, a 2048 bit key, a 4096 bit key, or any other suitable key. In some examples, trusted processor 106 generates a random number, and determines the key value based on the random number. For example, trusted processor 106 may use the random number as the key value. In some examples, trusted processor 106 scales the random number to a particular size (e.g., 1024 bits) to generate the key value.

Further, based on executing the instructions, trusted processor 106 may write the key value to the first key location 104A of key storage 104 to establish a first key. As described herein, the first key location 104A may include one or more fuses of key storage 104 that define the first key. As such, once written to, the first key location 104A cannot be written to again. In addition, based on executing the instructions, trusted processor 106 writes to the key activation location 110 to enable access to the first key location 104A, thereby "activating" the first key. As such, processor 116 may access the first key from the first key location 104A, and may perform operations to provision the first key to the memory device 120, thereby binding the SoC 102 with the memory device 120. For example, memory device 120 may be a UFS device, and processor 116 may program (e.g., write) the first key to an authentication key location 138 within the RPMB 127 of the memory device 120. Once programmed, the first key is provisioned to the memory device 120, and the authentication key location 138 within the RPMB 127 cannot be programmed again.

If, for example, the memory device 120 begins to fail or fails, the current memory device 120 may be replaced with another memory device (e.g., a memory device with the same storage components as memory device 120 but that has not been provisioned with a key). For instance, a service technician may remove memory device 120 from the integrated circuit package 100 (e.g., from a socket), and may place a new memory device into the integrated circuit package 100. The new memory device may include executable instructions characterizing an application within one or more data partitions 140. To bind to the new memory device, trusted processor 106 may obtain the executable instructions from the data partitions 140 of the new memory device, and may execute the instructions causing the trusted processor 106 to revoke the first key, activate the second key, and provision the second key into the new memory device.

For example, based on executing the instructions, trusted processor 106 may write to the key revocation location 108 to disable access to the first key location 104A, thereby "revoking" the first key. Upon writing to the key revocation location 108 to disable access to the first key location 104A, processor 116 no longer will have access to the first key location 104A. Further, based on executing the instructions, trusted processor 106 may generate a second key, which may be a random number, and may store the second key within second key location 104B. As described herein, the second key location 104B may include one or more fuses that define the second key. Trusted processor 106 may also, based on executing the instructions, write to the key activation location 110 to enable access to the second key location 104B, thereby "activating" the second key. As such, processor 116 may now access the second key from the second key location 104B, and may perform operations to provision the second key to the second memory device 120, thereby binding the SoC 102 with the second memory device 120. For example, the second memory device 120 may be a UFS device, and processor 116 may program (e.g., write) the second key to an authentication key location 138 within the RPMB 127 of the second memory device 120. Once programmed, the second key is provisioned to the memory device 120, and the authentication key location 138 within the RPMB 127 cannot be programmed again. In some instances, trusted processor 106 writes to key lock location 112 of key storage 104 to lock reads of the key storage 104. The key lock location 112 may be a read-access fuse that, when written, prevents read access to each of the keys. For instance, keylock location 112 may include multiple bits, where each bit corresponds to a read-access fuse for a key. If a bit is written to with a particular value (e.g., 1), the corresponding key is prevented from being read.

Figure 2:
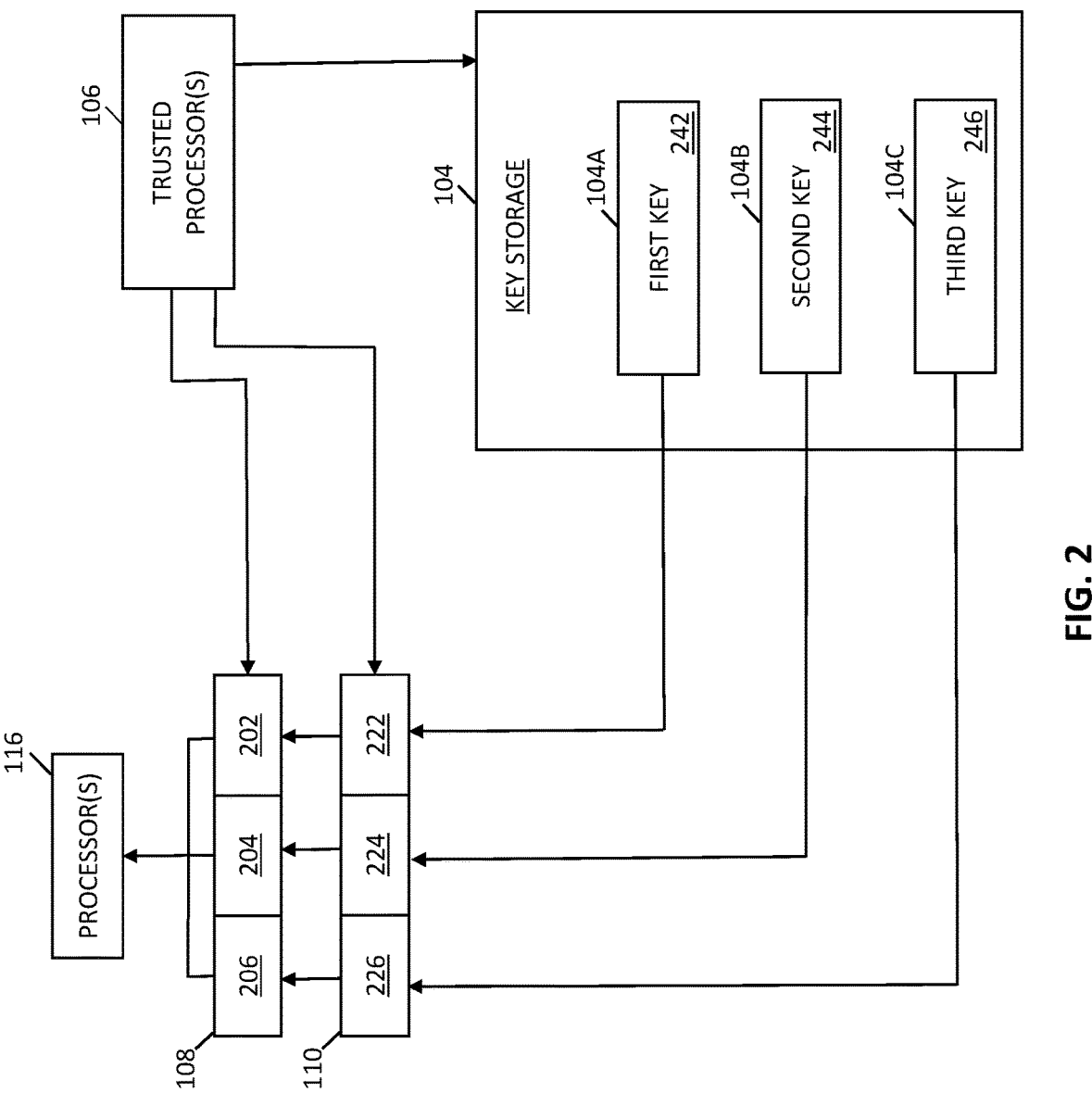
FIG. 2 is a block diagram illustrating portions of a system-on-a-chip, according to some implementations.

FIG. 2 illustrates key storage 104 access for trusted processor 106 and processor 116. For example, as illustrated, key revocation location 108 may include a first key revocation fuse 202, a second key revocation fuse 204, and a third key revocation fuse 206. In some examples, when programmed (e.g., written to), each of the first key revocation fuse 202, second key revocation fuse 204, and third key revocation fuse 206 are broken (e.g., access is not provided through the fuse). Key activation location 110 may include a first key activation fuse 222, a second key activation fuse 224, and a third key activation fuse 226. In some examples, when programmed (e.g., written to), each of the first key revocation fuse 202, second key revocation fuse 204, and third key revocation fuse 206 are unbroken (e.g., access is provided through the fuse).

Key revocation location 108 and key activation location 110 control whether processor 116 can read key storage 104. For instance, for processor 116 to read the first key location 104A, the first key revocation fuse 202 and the first key activation fuse 222 must each provide connectivity there through. For instance, processor 116 may read first key 242 when the first key revocation fuse 202 is not programmed and the first key activation fuse 222 is programmed, thereby allowing access through each of the respective fuses. Similarly, processor 116 may read second key 244 when the second key revocation fuse 204 is not programmed and the second key activation fuse 224 is programmed, thereby allowing access through each of the respective fuses. Further, processor 116 may read third key 246 when the third key revocation fuse 206 is not programmed and the third key activation fuse 226 is programmed, thereby allowing access through each of the respective fuses.

Trusted processor 106 can program any of the first key revocation fuse 202, second key revocation fuse 204, and third key revocation fuse 206 of the key revocation location 108, as well as any of the first key activation fuse 222, second key activation fuse 224, and third key activation fuse 226 of the key activation location 110. For instance, to activate a first key 242 located in the first key location 104A of key storage 104, trusted processor 106 may write to the first key activation fuse 222 to activate the first key 242. Because the first key activation fuse 222 is activated (e.g., thereby allowing access), and the first key revocation fuse 202 is not programmed (e.g., thereby also allowing access), processor 116 is able to read the first key 242 from the first key location 104A in key storage 104. Further, to deactivate the first key 242, trusted processor 106 may write to the first key revocation fuse 202. Because the first key revocation fuse 202 is now blown (e.g., thereby preventing access there through), processor 116 is not able to read the first key 242 from the first key location 104A.

Similarly, to activate the second key 244, trusted processor 106 may write to the second key activation fuse 224 to activate the second key 244. Because the second key activation fuse 224 is activated (e.g., thereby allowing access), and the second key revocation fuse 204 is not programmed (e.g., thereby also allowing access), processor 116 is able to read the second key 244 from the second key location 104B in key storage 104. Further, to deactivate the second key 244, trusted processor 106 may write to the second key revocation fuse 204. Because the second key revocation fuse 204 is now blown (e.g., thereby not allowing access there through), processor 116 is now prevented from reading the second key 244. Further, to activate the third key 246, trusted processor 106 may write to the third key activation fuse 226 to activate the third key 246. Because the third key activation fuse 226 is activated (e.g., thereby allowing access), and the third key revocation fuse 206 is not programmed (e.g., thereby also allowing access), processor 116 is able to read the third key 246 from the third key location 104C in key storage 104. Further, to deactivate the third key 246, trusted processor 106 may write to the third key revocation fuse 206. Because the third key revocation fuse 206 is now blown (e.g., thereby not allowing access there through), processor 116 is now prevented from reading the third key 246.

As described herein, in some examples, to write to any of the fuses described herein, trusted processor 106 may perform multiple write operations. For instance, non-volatile memory 108 may include a fuse address register, a fuse data register, and a fuse write register. To write data to a fuse, trusted processor 106 may write an address of a corresponding fuse to the fuse address register, and may write the data to be written to the fuse to the fuse data register. Trusted processor 106 may then write to the fuse write register, which causes the data in the fuse data register to be written to the fuse located at the address in the fuse address register. In other instances, trusted processor 106 may write the data directly to an address corresponding to a fuse, or may write to a fuse in any other suitable manner.

Figure 3A:
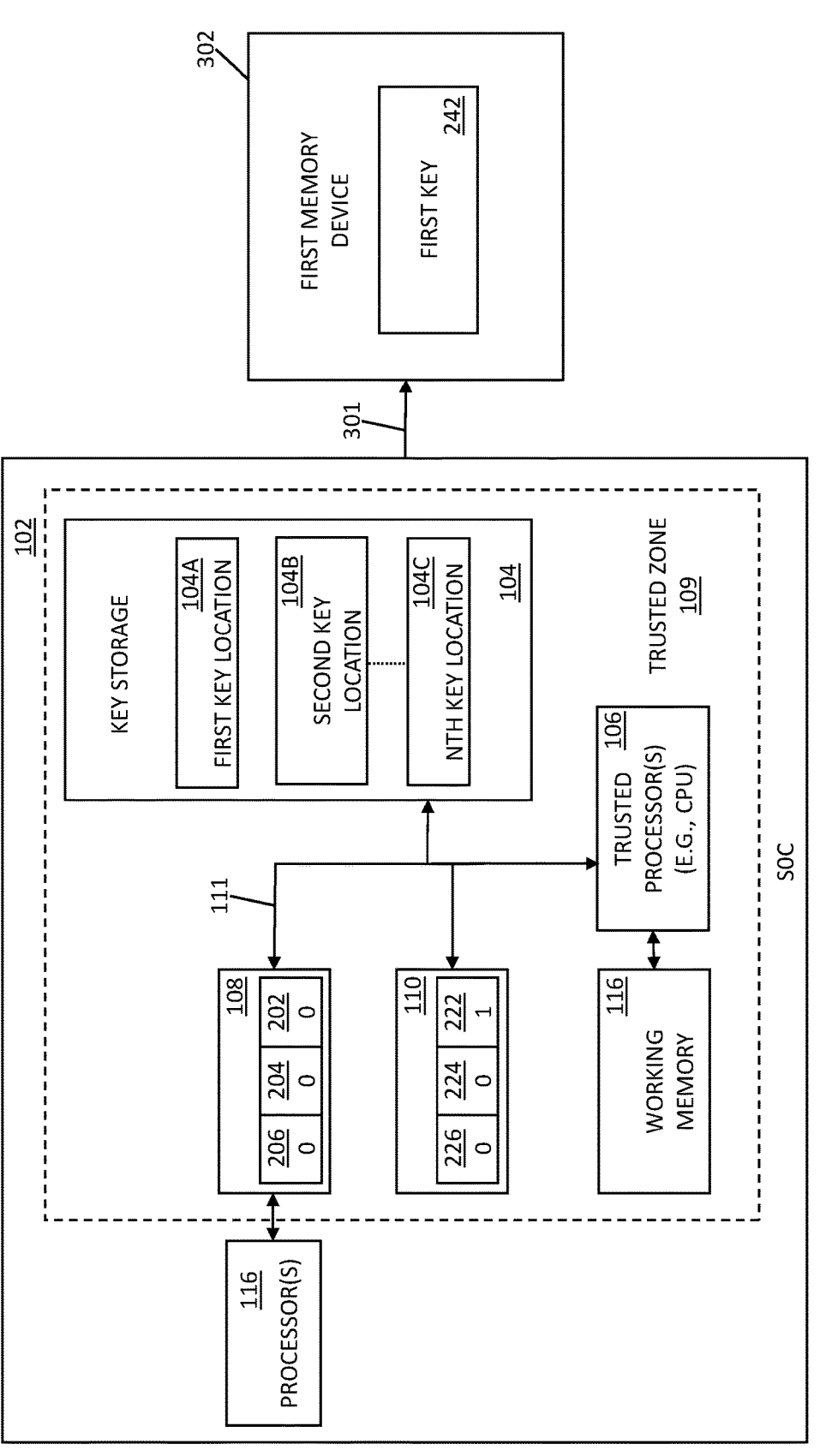
FIGS. 3A and 3B are block diagrams of a die package bound to memory devices, according to some implementations.
Figure 3B:
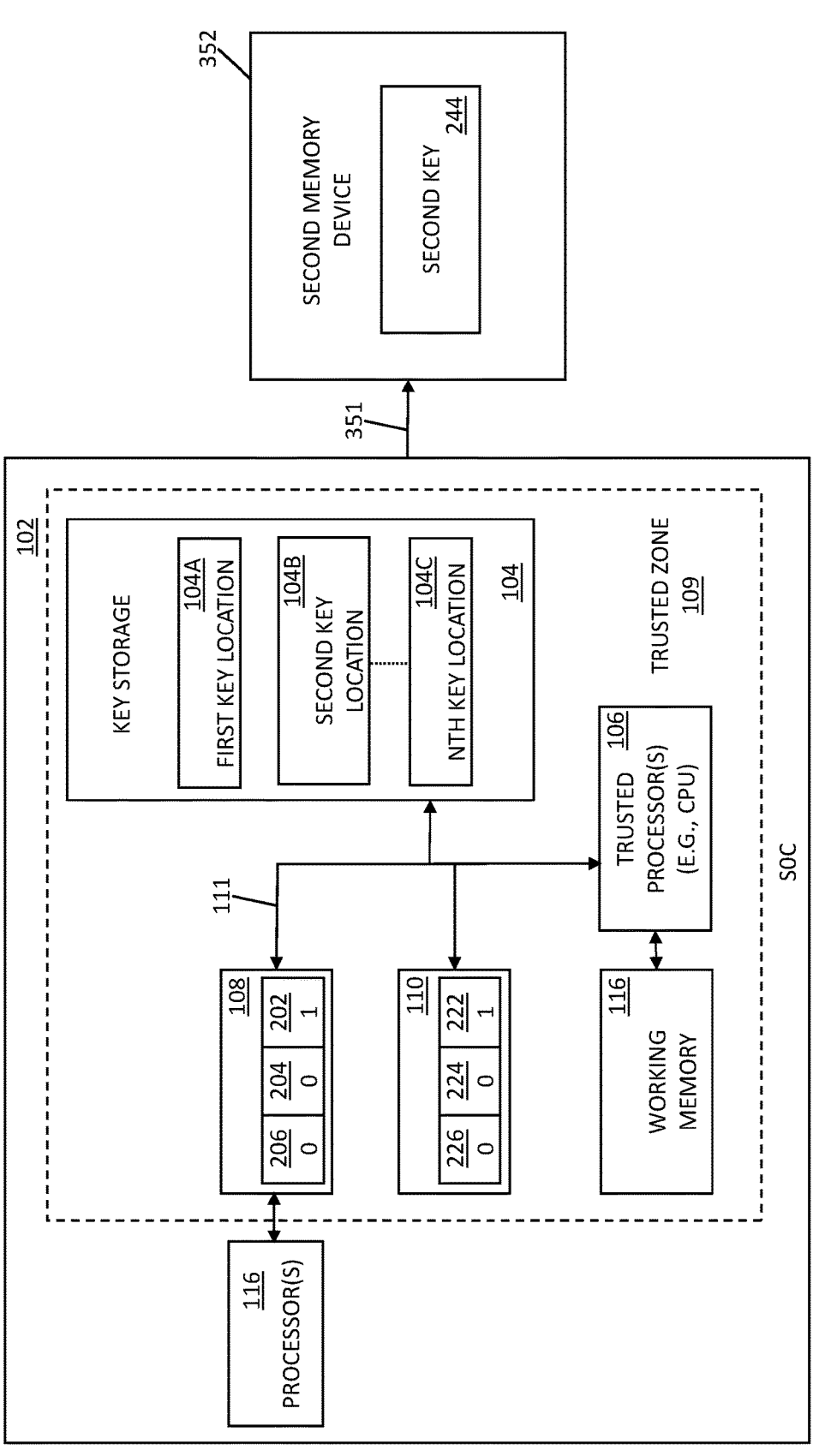

FIGS. 3A and 3B illustrate the provisioning of keys to memory devices to bind SoC 102 with the memory devices. In these examples, when not programmed (e.g., not broken), the key revocation fuses of the key revocation location 108 allow access there through, and when they are programmed (e.g., by writing a "1"), they do not allow access there through. Further, when the key activation fuses of the key activation location 110 are programmed (e.g., by writing a "1"), they allow access there through. When not programmed, however, they do not allow access there through.

With reference to FIG. 3A, each of the first key revocation fuse 202, second key revocation fuse 204, and third key revocation fuse 206 of the key revocation location 108 are not programmed (e.g., illustrated by the respective zeros), thereby allowing respective access there through. In addition, as illustrated, the first key activation fuse 222 of the key activation location 110 is programmed (e.g., illustrated by the one), while the second key activation fuse 224 and the third key activation fuse 226 are not programmed (e.g., illustrated by the respective zeros).

As such, in this example, processor 116 may read the first key location 104A, but cannot read the second key location 104B, and cannot read the N$^{th}$ key location 104C. Further, processor 116 may perform operations to provision the first key 242, as located in the first key location 104A, to the first memory device 302. For example, processor 116 may generate provisioning data 301 (e.g., a provisioning command) characterizing the provisioning of the first key 242 to the first memory device 302, and may transmit the provisioning data 301 to the first memory device 302. For instance, the provisioning data 301 may include a value of the first key 242 and an address of a memory location within a RPMB block of the first memory device 302. Upon receiving the provisioning data 301, the first memory device 302 may store the value of the first key 242 within an authentication key location (e.g., authentication key location 138 within the RPMB 127), which cannot be written to again. As such, the first memory device 302 will only successfully service accesses to at least a portion of its memory locations that are authenticated with the first key 242. In some examples, trusted processor 106 may generate the provisioning data 301, and may transmit the provisioning data 301 to the first memory device 302 to provision the first key 242.

With reference to FIG. 3B, the first memory device 302 is replaced with a second memory device 352. The trusted processor 106 may read executable instructions from a data partition of the second memory device 352, and may execute the instructions, causing the trusted processor 106 to update the key revocation location 108, key activation location 110, and key storage 104 to allow for the provisioning of a second key 244 to the second memory device 352. For example, and based on the execution of the received instructions, trusted processor 106 may generate a random number as the second key. Further, trusted processor 106 may execute the instructions, causing the trusted processor 106 to write to the first key revocation fuse 202 of the key revocation location 108 to disable access to the first key location 104A storing the first key. Trusted processor 106 may also, based on executing the instructions, write the second key to the second key location 104B of the key storage 104. In addition, trusted processor 106 may execute the instructions, causing the trusted processor 106 to write to the second key activation fuse 224 to activate the second key.

As such, in this example, processor 116 may read the second key location 104B, but cannot read the first key location 104A, and still cannot read the $N^{th}$ key location 104C. Processor 116 may execute the instructions, causing the processor 116 to provision the second key 244 to the second memory device 352. For example, processor 116 may generate provisioning data 351 (e.g., a provisioning command) characterizing the provisioning of the second key 244 to the second memory device 352, and may transmit the provisioning data 351 to the second memory device 352. For instance, the provisioning data 351 may include a value of the second key 244 and an address of a memory location within a RPMB block of the second memory device 352. Upon receiving the provisioning data 351, the second memory device 352 may store the value of the second key 244 within an authentication key location, which cannot be written to again. As such, the second memory device 352 will only successfully service accesses to at least a portion of its memory locations that are authenticated with the second key 244.

Figure 4A:
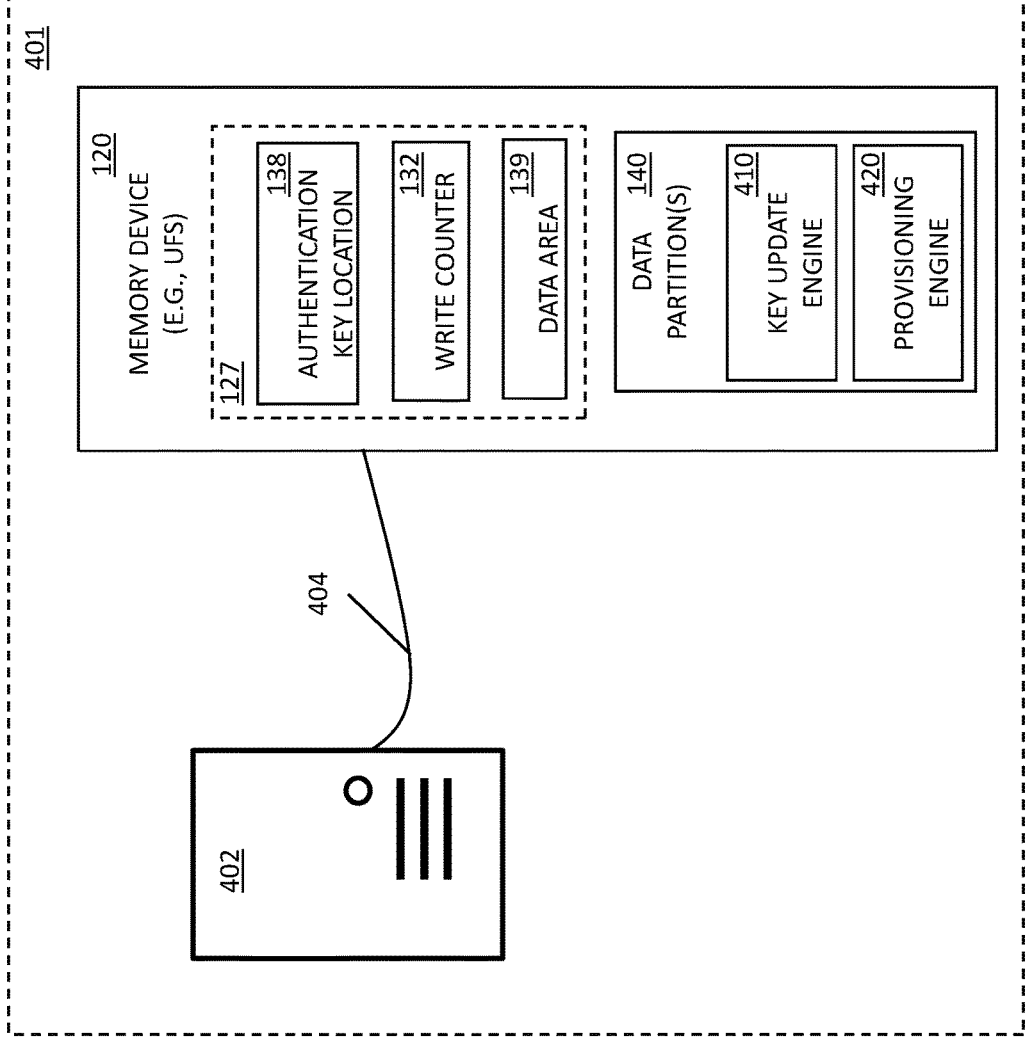
FIG. 4A illustrates a memory device programming system, according to some implementations.

FIG. 4A illustrates a memory programming device 402 electrically coupled via a communication bus 404 to the memory device 120. Memory programming device 402 may be located in a service center, such as service center 401, and can be any suitable device that can program memory device 120. For example, memory programing device 402 may include a FLASH programmer (e.g., a UFS device programmer) and a display that displays a user interface for the FLASH programmer. The memory programing device 402 may store data, such as executable instructions (e.g., which may be executed by one or more of trusted processor 106 and processor 116), configuration data, and any other suitable data. For instance, the memory programming device 402 may store a key update engine 410 and a provisioning engine 420 within one or more data partitions 140 of memory device 120.

The key update engine 410 may be executed by trusted processor 106 and, when executed, may cause trusted processor 106 to generate a key and write to the key revocation location 108, key activation location 110, and locations within key storage 104. For instance, the key update engine 410 may include instructions characterizing a provisioning trusted application, and a provisioning trusted zone service. The key update engine 410 may be provided by an original equipment manufacturer to service stations to allow them to initiate the provisioning process, for example.

Further, the key update engine 410 may include instructions that, when executed, cause trusted processor 106 to activate a key, such as the first key 242. In some examples, another version of the key update engine 410 may include instructions that, when executed by trusted processor 106, cause trusted processor 106 to revoke the first key 242, and activate a second key 244, as described herein. In some examples, yet another version of the key update engine 410 may include instructions that, when executed, cause trusted processor 106 to revoke the second key 244, and activate a third key 246, as described herein. The memory programming device 402 is operable to program any of these versions of the key update engine 410 to the memory device 120.

In addition, the provisioning engine 420, when executed by the trusted processor 106, may cause trusted processor 106 to provision an active key (e.g., first key 242) to the memory device 120. For instance, the provisioning engine 420 may include instructions characterizing a service center application, and a provisioning application programming interface (API).

For instance, memory programming device 402 may program the memory device 120 with a version of the key update engine 410 and the provisioning engine 420. The memory device 120, which is not provisioned with a key, is then placed into the integrated circuit package 100, and the integrated circuit package 100 is powered up. Trusted processor 106 may obtain the key update engine 410 from the corresponding data partition 140 of the memory device 120, and may execute the key update engine 410 to activate a key. For instance, to activate the third key 246, the trusted processor 106 may execute the key update engine 410 to generate the third key 246, revoke the second key 244 by writing to the second key revocation fuse 204 of the key revocation location 108, write the third key 246 to the Nth key location 104C, and activate the third key 246 by writing to third key activation fuse 226 of the key activation location 110.

Further, trusted processor 106 may obtain the provisioning engine 420 from the corresponding data partition 140 of the memory device 120, and may execute the provisioning engine 420 to provision the active key (e.g., the third key 246) to the memory device 120. For example, as described herein, trusted processor 106 may generate provisioning data, such as provisioning data 301, 351, and may transmit the provisioning data to the memory device 120 to provision the active key, which may be stored within the authentication key location 138 of the RPMB 127 of the memory device 120.

Figure 4B:
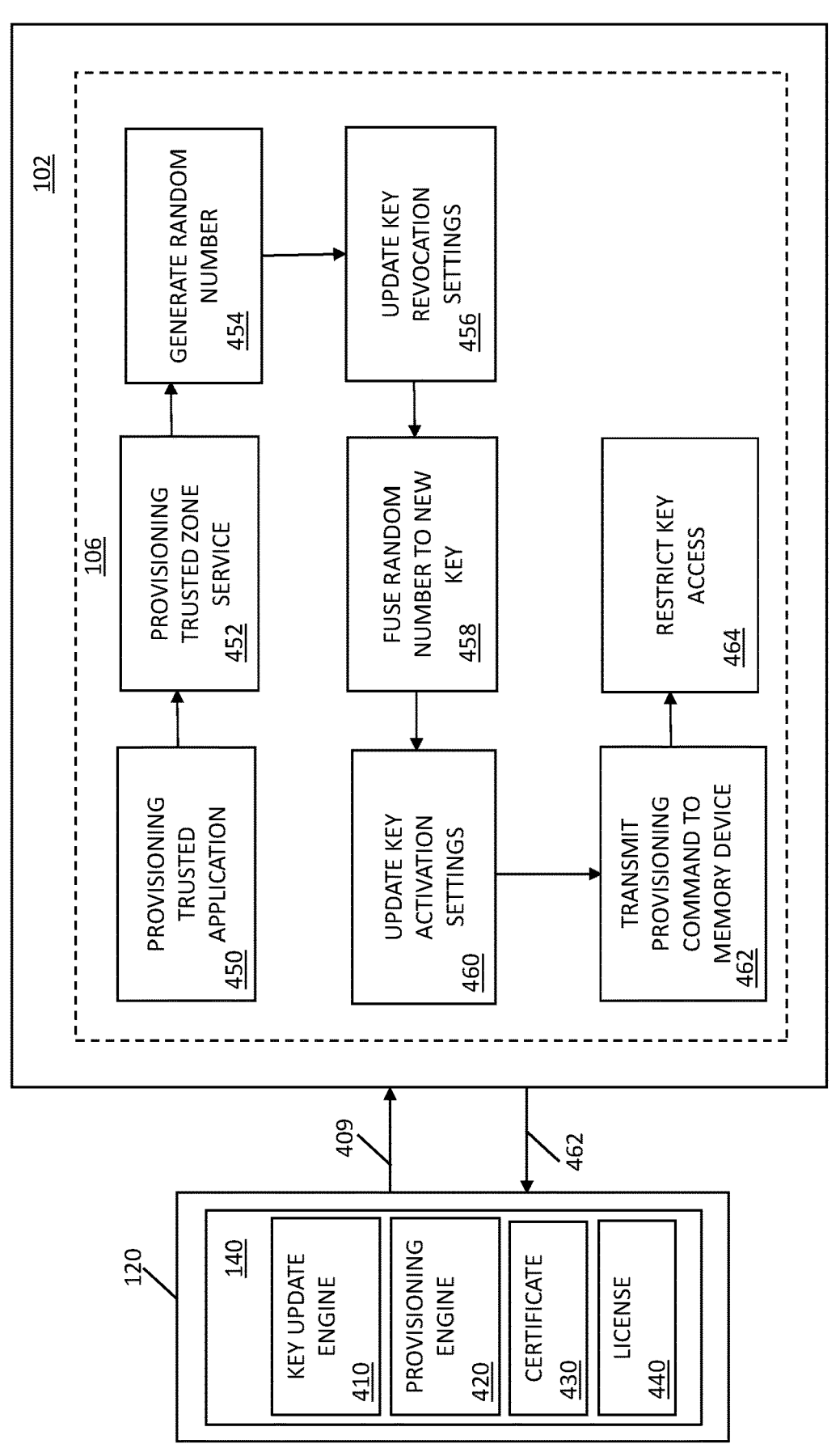
FIG. 4B illustrates operations of a system-on-a-chip based on the programmed memory device of FIG. 4A, according to some implementations.

FIG. 4B, for instance, illustrates various operations of the trusted processor 106 to bind to a memory device 120 with a key. As illustrated, trusted processor 106 (e.g., at power-up) may obtain data 409 from memory device 120. The data 409 may include data within any of the data partitions 140 of the memory device 120. For instance, as illustrated, one or more data partitions 140 of the memory device 120 store one or more of the key update engine 410, the provisioning engine 420, a certificate 430, and a license 440. The trusted processor 106 may receive the key update engine 410 as a portion of the received data 409, and may execute the key update engine 410 to establish (e.g., within the trusted zone 109) a provisioning trusted application 450 and a provisioning trusted zone service 452. The executed provisioning trusted application 450 may, in some examples, validate the certificate 430. If the certificate 430 is not valid, the executed provisioning trusted application 450 prevents further provisioning operations. Additionally or alternatively, the executed provisioning trusted zone service 452 may perform operations to determine the validity of license 440 (e.g., that the license 440 is valid and still in effect). If the executed provisioning trusted zone service 452 determines the license 440 is not valid, the executed provisioning trusted zone service 452 prevents further provisioning operations.

Further, the trusted processor 106 may execute the key update engine 410 to generate a random number 454. The trusted processor 106 may also update key revocation settings 456 based on executing the instructions. For instance, the trusted processor 106 may write to the key revocation location 108 to revoke a key, such as the first key 242. Further, the trusted processor 106 may execute the key update engine 410 to fuse the random number to a new key 458. For example, the trusted processor 106 may write the generated random number to the second key location 104B within the key storage 104 to generate the second key 244. The trusted processor 106 may also, based on executing the instructions, update key activation settings 460. For instance, the trusted processor 106 may write to the key activation location 110 to activate the new key, such as the second key 244.

Additionally, once the new key is activated, trusted processor 106 may, based on executing the instructions (e.g., the provisioning trusted application 450 and the provisioning trusted zone service 452), transmit a provisioning command 462 to memory device 120. For instance, trusted processor 106 may generate provisioning data 351 characterizing the provisioning of the new key to the memory device 120, and may transmit the provisioning data to the memory device 120. Based on the provisioning data, the memory device 120 may store the new key within an authentication key location (e.g., authentication key location 138 of RPMB 127), and the SoC 102 may be bound to the memory device 120 based on the new key.

In some examples, trusted processor 106 may execute the instructions, causing the trusted processor 106 to write to a key storage location to restrict key access 464 of the new key. For instance, the trusted processor 106 may write to key lock location 112 to prevent untrusted reads of a corresponding key location of the key storage 104. The key lock location 112 may be a read-access fuse that, when written, prevents read access from outside the trusted zone to each of the keys.

FIG. 5 is a flowchart of an exemplary process 500 for binding a system-on-a-chip with memory devices, in accordance with some exemplary embodiments. For example, one or more die packages, such SoC 102, may perform one or more of the operations of exemplary process 500. Referring to FIG. 5, at block 502, a first key value is generated. For example, SoC 102 may generate a random number, and may determine the first key value (e.g., first key 242) based on the random number. The first key value may represent an RSA key value, for instance. At block 504, the first key value is written to a first key memory location. As an example, SoC 102 may write the first key value to a first key location 104A of key storage 104. As described herein, the first key location 104A may include one or more fuses that define the first key value.

Proceeding to block 506, to activate the first key value, a key activation memory location is written to. For example, SoC 102 may write to first key activation fuse 222 of key activation location 110 to activate the first key 242. At block 508, provisioning data is transmitted to provision the first key value to a first memory device. For instance, SoC 102 may generate provisioning data 301 characterizing the provisioning of the first key 242 to the first memory device 302, and may transmit the provisioning data 301 to the first memory device 302.

In some instances, the first memory device may begin to fail. For instance, the first memory device may fail to respond to read or write operations, may fail to successfully store data in response to write transactions, or may fail to provide accurate data in response to read transactions. In these instances, the first memory device may be replaced with a second memory device. The second memory device may store executable instructions, such as the key update engine 410 described herein.

In circumstances such as these, at block 510, a second key value is generated. For instance, SoC 102 may generate a second random number, and may determine the second key value (e.g., second key 244) based on the second random number. Further, at block 512, to revoke the first key value, a key revocation memory location is written to. For example, SoC 102 may write to first key revocation fuse 202 of key revocation location 108 to revoke (e.g., disable) the first key 242 stored in the first key location 104A.

Proceeding to block 514, the second key value is written to a second key memory location. As an example, SoC 102 may write the second key value to a second key location 104B of key storage 104. At block 516, to activate the second key value, the key activation memory location is written to. For example, SoC 102 may write to second key activation fuse 224 of key activation location 110 to activate the second key 244. Further, at block 518, second provisioning data is transmitted to provision the second key value to the second memory device. For instance, SoC 102 may generate provisioning data 351 characterizing the provisioning of the second key 244 to the second memory device 352, and may transmit the provisioning data 351 to the second memory device 352.

Figure 6:
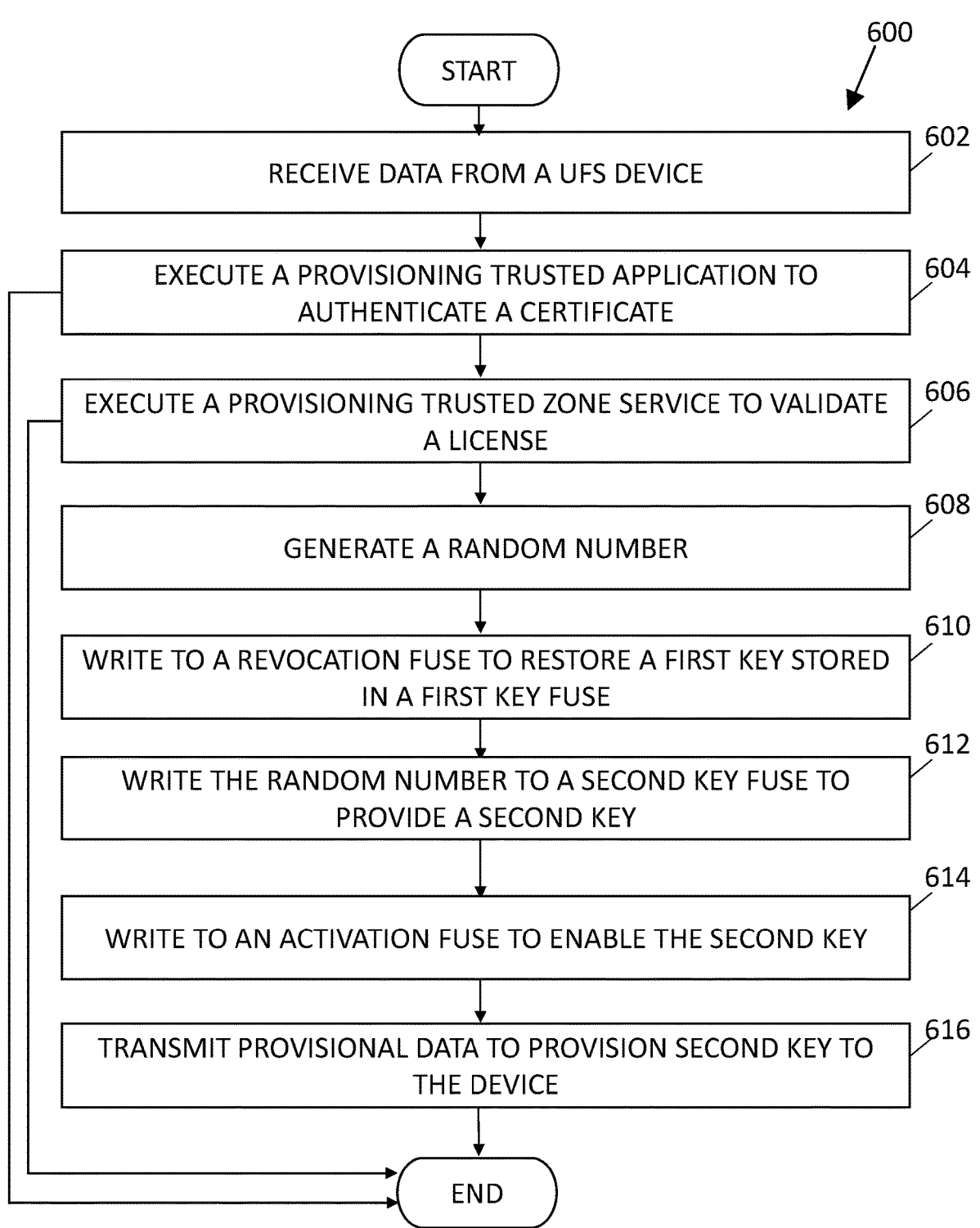
FIG. 6 is a flowchart of an exemplary process to bind a system-on-a-chip with a memory device, according to some implementations.

FIG. 6 is a flowchart of an exemplary process 600 for binding a system-on-a-chip (SoC) with a UFS device, in accordance with some exemplary embodiments. For example, one or more die packages, such SoC 102, may perform one or more of the operations of exemplary process 600. Referring to FIG. 6, at block 602, data is received from a UFS device. The data may include executable instructions, a certificate (e.g., certificate 430), and a license (e.g., license 440). The executable instructions may characterize, for example, a provisioning trusted application, a provisioning trusted zone service, and a key update engine 410. The certificate, if valid, may establish an authentication of a third party, such as an original equipment manufacturer (OEM). Further, the license may indicate whether the provisioning of the SoC is permitted.

At block 604, the certificate is authenticated based on executing the provisioning trusted application. For example, SoC 102 may execute the provisioning trusted application to determine, based on the certificate 430, the authenticity of a third-party. If SoC 102 fails to successfully authenticate the third-party, provisioning of a key to the UFS device is not allowed, and the method ends. Otherwise, if SoC 102 successfully authenticates the third-party, the method proceeds to block 606. At block 606, the license is validated based on executing the provisioning trusted zone service. For example, SoC 102 may execute the provisioning trusted application to determine whether the license 440 is valid. If the license is not valid, provisioning of a key to the UFS device is not allowed, and the method ends. Otherwise, if the license is valid, the method proceeds to block 608.

At block 608, a random number is generated. For example, SoC 102 may execute a random number generator to generate the random number. Further, at block 610, to revoke (e.g., disable) a first key stored in a first key fuse, a revocation fuse is written to. For instance, SoC 102 may write to first key revocation fuse 202 of key revocation location 108 to revoke the first key 242 stored in the first key location 104A. Proceeding to block 612, the random number is written to a second key fuse to provide a second key. For example, SoC 102 may write the random number to the second key location 104B to establish the second key 244.

At block 614, to enable the second key fuse, an activation fuse is written to. For example, SoC 102 may write to second key activation fuse 224 of key activation location 110 to activate the second key 244. Further, at block 616, provisioning data is transmitted to the UFS device to provision the second key to the UFS device. The SoC and the UFS device are now bound based on the second key.

Implementation examples are further described in the following numbered clauses:

1. A die package comprising:
a first memory device; and
a processor electrically coupled to the first memory device, the processor being configured to execute instructions to:
  write to a key revocation location of the first memory device, the writing to the key revocation location revoking a first key stored in a first key location of the first memory device;
  write a second key to a second key location of the first memory device;
  write to a key activation location of the first memory device, the writing to the key activation location activating the second key;
  generate provisioning data characterizing the second key; and
  transmit the provisioning data to a second memory device, the provisioning data causing the second memory device to store the second key.

2. The die package of clause 1, wherein the processor is configured to execute the instructions to:
  write the first key to the first key location of the first memory device; and
  write to the key activation location of the first memory device, the writing to the key activation location activating the first key.

3. The die package of clause 2, wherein the processor is configured to execute the instructions to transmit additional provisioning data to a third memory device, the additional provisioning data causing the third memory device to store the first key.

4. The die package of any of clauses 1-3, wherein the processor is configured to execute the instructions to randomly generate the second key.

5. The die package of any of clauses 1-4, wherein the processor is configured to execute the instructions to write to a key lock location of the first memory device, the writing to the key lock location disabling read access of the second key location.

6. The die package of any of clauses 1-5, wherein the second memory device is a Universal Flash Storage device.

7. The die package of any of clauses 1-6, wherein the provisioning data causes the second memory device to store the second key within a Replay Protected Memory Block.

8. The die package of any of clauses 1-7, wherein the processor is configured to receive at least a portion of the instructions from the second memory device.

9. The die package of any of clauses 1-8, wherein the processor is configured to execute the instructions to:
  receive a certificate from the second memory device;
  authenticate a third-party based on the certificate; and
  in response to the authentication, write to the key revocation location of the first memory device.

10. The die package of any of clauses 1-9, wherein the processor is configured to execute the instructions to:
  receive a license from the second memory device;
  determine the license is valid; and
  in response to the determination, write to the key revocation location of the first memory device.

11. The die package of any of clauses 1-10 comprising a system-on-a-chip, wherein the processor and the first memory device are disposed within a trusted zone of the system-on-a-chip.

12. A die package comprising:
a plurality of key activation fuses, each of the plurality of key activation fuses being configured to activate a corresponding one of a plurality of keys;
a plurality of key revocation fuses, each of the plurality of key revocation fuses being configured to revoke a corresponding one of the plurality of keys;
a key fuse associated with each of the plurality of keys, each key fuse being configured to store a corresponding one of the plurality of keys; and
a processor electrically coupled to the plurality of key activation fuses, the plurality of key revocation fuses, and the key fuse associated with each of the plurality of keys, the processor being configured to:
  generate a first key value;
  write the first key value to the key fuse associated with a first one of the plurality of keys;
  write to a first one of the plurality of key activation fuses to activate the first one of the plurality of keys;
  write to a first one of the plurality of key revocation fuses to revoke the first one of the plurality of keys;
  generate a second key value; and
  write the second key value to the key fuse associated with a second one of the plurality of keys.

13. The die package of clause 12, wherein the processor is configured to write to a second one of the plurality of key activation fuses to activate the second one of the plurality of keys.

14. The die package of any of clauses 12-13, wherein the processor is configured to:
  generate a third key value;
  write to a second one of the plurality of key revocation fuses to revoke the second one of the plurality of keys;
  write the third key value to the key fuse associated with a third one of the plurality of keys; and
  write to a third one of the plurality of key activation fuses to activate the third one of the plurality of keys.

15. The die package of any of clauses 12-14, wherein the processor is configured to:

generate provisioning data characterizing the second one of the plurality of keys; and transmit the provisioning data to a memory device, the provisioning data causing the memory device to store the second one of the plurality of keys within a Replay Protected Memory Block.

16. The die package of clause 15, wherein the memory device is a Universal Flash Storage device.

17. The die package of any of clauses 12-16 comprising a system-on-a-chip, wherein the plurality of key activation fuses, the plurality of key revocation fuses, the key fuse associated with each of the plurality of keys, and the processor are disposed within a trusted zone of the system-on-a-chip.

18. The die package of any of clauses 12-17, wherein the processor is configured to randomly generate the first key value.

19. A method by at least one processor, the method comprising:

writing to a key revocation location of a first memory device, the writing to the key revocation location revoking a first key;

writing a second key to a second key location of the first memory device;

writing to a key activation location of the first memory device, the writing to the key activation location activating the second key;

generating provisioning data characterizing the second key; and transmitting the provisioning data to a second memory device, the provisioning data causing the second memory device to store the second key.

20. The method of clause 19, further comprising:

writing the first key to the first key location of the first memory device; and writing to the key activation location of the first memory device, the writing to the key activation location activating the first key.

21. The method of clause 20, further comprising transmitting additional provisioning data to a third memory device, the additional provisioning data causing the third memory device to store the first key.

22. The method of any of clauses 19-21, further comprising randomly generating the second key.

23. The method of any of clauses 19-22, further comprising writing to a key lock location of the first memory device, the writing to the key lock location disabling read access of the second key location.

24. The method of any of clauses 19-23, wherein the second memory device is a Universal Flash Storage device.

25. The method of any of clauses 19-24, wherein the provisioning data causes the second memory device to store the second key within a Replay Protected Memory Block.

26. The method of any of clauses 19-25, further comprising receiving at least a portion of the instructions from the second memory device.

27. The method of any of clauses 19-26, further comprising:

receiving a certificate from the second memory device;

authenticating a third-party based on the certificate; and in response to the authentication, writing to the key revocation location of the first memory device.

28. The method of any of clauses 19-27, further comprising:

receiving a license from the second memory device;

determining the license is valid; and in response to the determination, writing to the key revocation location of the first memory device.

29. The method of any of clauses 19-28 wherein the processor and the first memory device are disposed within a trusted zone of a system-on-a-chip.

30. A non-transitory, machine-readable storage medium comprising instructions that, when executed by at least one processor, cause the at least one processor to:

write to a key revocation location of a first memory device, the writing to the key revocation location revoking a first key;

write a second key to a second key location of the first memory device;

write to a key activation location of the first memory device, the writing to the key activation location activating the second key;

generating provisioning data characterizing the second key; and transmit the provisioning data to a second memory device, the provisioning data causing the second memory device to store the second key.

31. The non-transitory, machine-readable storage medium of clause 30, wherein the instructions, when executed by the at least one processor, cause the at least one processor to:

write the first key to the first key location of the first memory device; and write to the key activation location of the first memory device, the writing to the key activation location activating the first key.

32. The non-transitory, machine-readable storage medium of clause 31, wherein the instructions, when executed by the at least one processor, cause the at least one processor to transmit additional provisioning data to a third memory device, the additional provisioning data causing the third memory device to store the first key.

33. The non-transitory, machine-readable storage medium of any of clauses 31-32, wherein the instructions, when executed by the at least one processor, cause the at least one processor to randomly generate the second key.

34. The non-transitory, machine-readable storage medium of any of clauses 31-33, wherein the instructions, when executed by the at least one processor, cause the at least one processor to write to a key lock location of the first memory device, the writing to the key lock location disabling read access of the second key location.

35. The non-transitory, machine-readable storage medium of any of clauses 31-34, wherein the second memory device is a Universal Flash Storage device.

36. The non-transitory, machine-readable storage medium of any of clauses 31-35, wherein the provisioning data causes the second memory device to store the second key within a Replay Protected Memory Block.

37. The non-transitory, machine-readable storage medium of any of clauses 31-36, wherein the instructions, when executed by the at least one processor, cause the at least one processor to receive at least a portion of the instructions from the second memory device.

38. The non-transitory, machine-readable storage medium of any of clauses 31-37, wherein the instructions, when executed by the at least one processor, cause the at least one processor to:

receive a certificate from the second memory device;

authenticate a third-party based on the certificate; and in response to the authentication, write to the key revocation location of the first memory device.

39. The non-transitory, machine-readable storage medium of any of clauses 31-38, wherein the instructions, when executed by the at least one processor, cause the at least one processor to:

receive a license from the second memory device;

determine the license is valid; and in response to the determination, write to the key revocation location of the first memory device.

40. The non-transitory, machine-readable storage medium of any of clauses 31-39 wherein the processor and the first memory device are disposed within a trusted zone of a system-on-a-chip.

41. A method by at least one processor, the method comprising:

generating a first key value;

writing a first key value to a first key fuse associated with a first one of a plurality of keys;

writing to a first one of a plurality of key activation fuses to activate the first one of the plurality of keys;

writing to a first one of a plurality of key revocation fuses to revoke the first one of the plurality of keys;

generating a second key value; and writing the second key value to a second key fuse associated with a second one of the plurality of keys.

42. The method of clause 41, further comprising writing to a second one of the plurality of key activation fuses to activate the second one of the plurality of keys.

43. The method of any of clauses 41-42, further comprising:

generating a third key value;

writing to a second one of the plurality of key revocation fuses to revoke the second one of the plurality of keys;

writing the third key value to a third key fuse associated with a third one of the plurality of keys; and writing to a third one of the plurality of key activation fuses to activate the third one of the plurality of keys.

44. The method of any of clauses 41-43, further comprising:

generating provisioning data characterizing the second one of the plurality of keys; and transmitting the provisioning data to a memory device, the provisioning data causing the memory device to store the second one of the plurality of keys within a Replay Protected Memory Block.

45. The method of clause 44, wherein the memory device is a Universal Flash Storage device.

46. The method of any of clauses 41-45 comprising a system-on-a-chip, wherein the plurality of key activation fuses, the plurality of key revocation fuses, the key fuse associated with each of the plurality of keys, and the processor are disposed within a trusted zone of the system-on-a-chip.

47. The method of any of clauses 41-46, further comprising randomly generating the first key value.

48. A non-transitory, machine-readable storage medium comprising instructions that, when executed by at least one processor, cause the at least one processor to:

generate a first key value;

write a first key value to a first key fuse associated with a first one of a plurality of keys;

write to a first one of a plurality of key activation fuses to activate the first one of the plurality of keys;

write to a first one of a plurality of key revocation fuses to revoke the first one of the plurality of keys;

generate a second key value; and write the second key value to a second key fuse associated with a second one of the plurality of keys.

49. The non-transitory, machine-readable storage medium of any of clause 48, wherein the instructions, when executed by the at least one processor, cause the at least one processor to write to a second one of the plurality of key activation fuses to activate the second one of the plurality of keys.

50. The non-transitory, machine-readable storage medium of any of clauses 48-49, wherein the instructions, when executed by the at least one processor, cause the at least one processor to:

generate a third key value;

write to a second one of the plurality of key revocation fuses to revoke the second one of the plurality of keys;

write the third key value to a third key fuse associated with a third one of the plurality of keys; and write to a third one of the plurality of key activation fuses to activate the third one of the plurality of keys.

51. The non-transitory, machine-readable storage medium of any of clauses 48-50, wherein the instructions, when executed by the at least one processor, cause the at least one processor to:

generate provisioning data characterizing the second one of the plurality of keys; and transmit the provisioning data to a memory device, the provisioning data causing the memory device to store the second one of the plurality of keys within a Replay Protected Memory Block.

52. The non-transitory, machine-readable storage medium of clause 51, wherein the memory device is a Universal Flash Storage device.

53. The non-transitory, machine-readable storage medium of any of clauses 48-52 comprising a system-on-a-chip, wherein the plurality of key activation fuses, the plurality of key revocation fuses, the key fuse associated with each of the plurality of keys, and the processor are disposed within a trusted zone of the system-on-a-chip.

54. The non-transitory, machine-readable storage medium of any of clauses 48-53, wherein the instructions, when executed by the at least one processor, cause the at least one processor to randomly generate the first key value.

Although the methods described above are with reference to the illustrated flowcharts, many other ways of performing the acts associated with the methods may be used. For example, the order of some operations may be changed, and some embodiments may omit one or more of the operations described and/or include additional operations.

In addition, the methods and system described herein may be at least partially embodied in the form of computer-implemented processes and apparatus for practicing those processes. The disclosed methods may also be at least partially embodied in the form of tangible, non-transitory machine-readable storage media encoded with computer program code that, when executed, causes a machine to fabricate at least one integrated circuit that performs one or more of the operations described herein. For example, the methods may be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for causing a machine to fabricate the integrated circuit. The methods may also be at least partially embodied in the form of a computer into which computer program code is loaded or executed, such that, the computer becomes a special purpose computer for causing a machine to fabricate the integrated circuit. For instance, when implemented on a general-purpose processor, computer program code segments can configure the processor to create specific logic circuits. The methods may alternatively be at least partially embodied in application specific integrated circuits or any other integrated circuits for performing the methods.

In addition, terms such as "circuit," "circuitry," "logic," and the like can include, alone or in combination, analog circuitry, digital circuitry, hardwired circuitry, programmable circuitry, processing circuitry, hardware logic circuitry, state machine circuitry, and any other suitable type of physical hardware components. Further, the embodiments described herein may be employed within various types of devices such as networking devices, telecommunication devices, smartphone devices, gaming devices, enterprise devices, storage devices (e.g., cloud storage devices), automobile systems (e.g., collision avoidance systems, object detection systems, navigation systems, etc.), and computing devices (e.g., cloud computing devices), among other types of devices.

The subject matter has been described in terms of exemplary embodiments. Because they are only examples, the claimed inventions are not limited to these embodiments. Changes and modifications may be made without departing the spirit of the claimed subject matter. It is intended that the claims cover such changes and modifications.

We claim:

1. A die package comprising:
a first memory device within the die package; and
a processor within the die package electrically coupled to the first memory device, the processor being configured to execute instructions to:
write to a key revocation location of the first memory device, the writing to the key revocation location revoking a first key stored in a first key location of key storage positioned within the first memory device;
write a second key to a second key location key storage within the first memory device;
write to a key activation location of the first memory device, the writing to the key activation location activating the second key;
generate provisioning data comprising a value for the second key; and
transmit the provisioning data to a second memory device external to the die package, the provisioning data causing the second memory device to store the value for the second key within an authentication key location of the second memory device, the authentication key location comprising a one-time-programmable memory, the second memory device supporting memory requests to at least a portion of its memory locations only authenticated with the second key.

2. The die package of claim 1, wherein the processor is configured to execute the instructions to:
write the first key to the first key location of the first memory device; and
write to the key activation location of the first memory device, the writing to the key activation location activating the first key.

3. The die package of claim 2, wherein the processor is configured to execute the instructions to transmit additional provisioning data to a third memory device, the additional provisioning data causing the third memory device to store the first key.

4. The die package of claim 1, wherein the processor is configured to execute the instructions to randomly generate the second key.

5. The die package of claim 1, wherein the processor is configured to execute the instructions to write to a key lock location of the first memory device, the writing to the key lock location disabling read access of the second key location.

6. The die package of claim 1, wherein the second memory device is a Universal Flash Storage device.

7. The die package of claim 1, wherein the provisioning data causes the second memory device to store the second key within a Replay Protected Memory Block.

8. The die package of claim 1, wherein the processor is configured to receive at least a portion of the instructions from the second memory device.

9. The die package of claim 1, wherein the processor is configured to execute the instructions to:
receive a certificate from the second memory device;
authenticate a third-party based on the certificate; and
in response to the authentication, write to the key revocation location of the first memory device.

10. The die package of claim 1, wherein the processor is configured to execute the instructions to:
receive a license from the second memory device;
determine the license is valid; and
in response to the determination, write to the key revocation location of the first memory device.

11. The die package of claim 1 comprising a system-on-a-chip, wherein the processor and the first memory device are disposed within a trusted zone of the system-on-a-chip.

12. A die package system comprising:
a plurality of key activation fuses within a die package, each of the plurality of key activation fuses being configured to activate a corresponding one of a plurality of keys;
a plurality of key revocation fuses within the die package, each of the plurality of key revocation fuses being configured to revoke a corresponding one of the plurality of keys;
a key fuse associated with a respective key of the plurality of keys, each key fuse being stored in a key storage of the die package, each key fuse being configured to store a corresponding one of the plurality of keys; and
a processor electrically coupled to the plurality of key activation fuses, the plurality of key revocation fuses, and each respective key fuse, the processor being configured to:
generate a first key value;
write the first key value to the key fuse associated with a first one of the plurality of keys;
write to a first one of the plurality of key activation fuses to activate the first one of the plurality of keys;
write to a first one of the plurality of key revocation fuses to revoke the first one of the plurality of keys;
generate a second key value;
write the second key value to the key fuse associated with a second one of the plurality of keys;
write to a second one of the plurality of key activation fuses to activate the second one of the plurality of keys;
generate provisioning data comprising the second key value; and
transmit the provisioning data to a memory device external to the die package, the provisioning data causing the memory device to store the second key value within an authentication key location of the memory device, the authentication key location comprising a one-time-programmable memory, the memory device supporting memory requests to at least a portion of its memory locations only authenticated with the second key value.

13. The die package system of claim 12, wherein the processor is configured to:

generate a third key value;

write to a second one of the plurality of key revocation fuses to revoke the second one of the plurality of keys;

write the third key value to the key fuse associated with a third one of the plurality of keys; and write to a third one of the plurality of key activation fuses to activate the third one of the plurality of keys.

14. The die package system of claim 12, wherein the one-time-programmable memory comprises a Replay Protected Memory Block.

15. The die package system of claim 14, wherein the memory device external to the die package is a Universal Flash Storage device.

16. The die package system of claim 12 comprising a system-on-a-chip, wherein the plurality of key activation fuses, the plurality of key revocation fuses, the key fuse associated with each of the plurality of keys, and the processor are disposed within a trusted zone of the system-on-a-chip.

17. The die package system of claim 12, wherein the processor is configured to randomly generate the first key value.

\* \* \* \* \*